Aug. 22, 1961 G. DAMEWOOD ET AL 2,997,124
MECHANICAL VIBRATION REDUCING APPARATUS
Filed July 12, 1956 2 Sheets-Sheet 1

GLENN DAMEWOOD
MILES T. HANCHETT
INVENTORS

BY Browning, Simms & Hyer

ATTORNEY

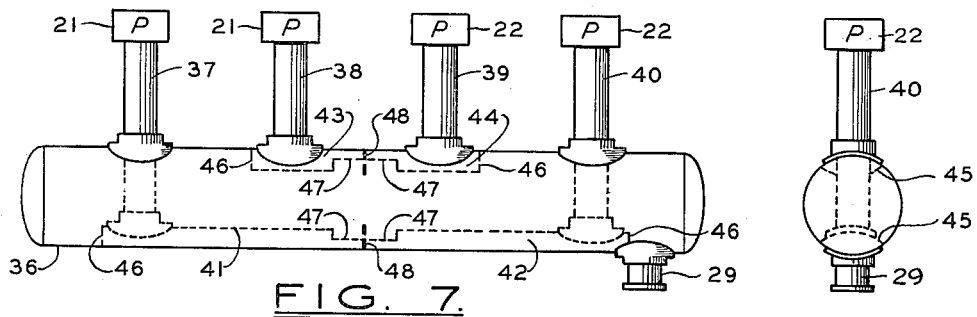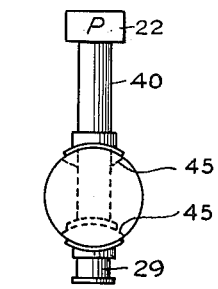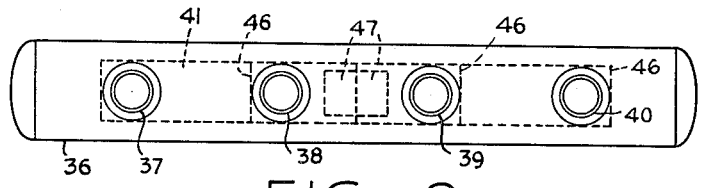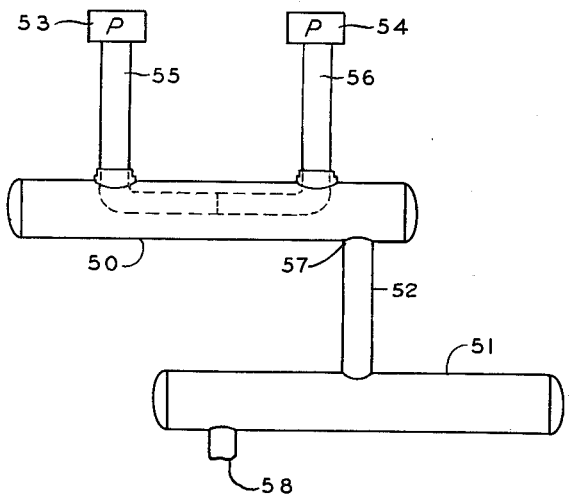
FIG. 7.
FIG. 8.
FIG. 9.
FIG. 10.
GLENN DAMEWOOD
MILES T. HANCHETT
INVENTORS
ATTORNEY

United States Patent Office 2,997,124
Patented Aug. 22, 1961

2,997,124
MECHANICAL VIBRATION REDUCING
APPARATUS
Glenn Damewood and Miles T. Hanchett, San Antonio,
Tex., assignors to Southern Gas Association, Dallas,
Tex., a corporation of Georgia
Filed July 12, 1956, Ser. No. 597,408
4 Claims. (Cl. 181—47)

This invention relates to improvements in acoustic filters of the general type employed to dampen pulsations in flowing fluid streams such as those created by compressors, blowers, internal combustion engines and the like. In one of its aspects, it relates to a method for reducing mechanical vibration in a fluid flow system subject to acoustic pulsations. In another aspect, it relates to an apparatus wherein an acoustical capacitance is connected to a plurality of acoustic pulsation generating devices in a manner as to suppress mechanical vibration.

In many fluid handling systems, an acoustic pressure wave generating device is connected to an acoustical capacitance or vessel (frequently termed a "bottle," "manifold" or "header") in such a manner that standing waves of considerable magnitude are generated in the capacitance. As a result, there often occurs serious mechanical vibration in the fluid system. As one example of such a system, internal combustion engines are frequently equipped with silencers or mufflers which may take the form of a plurality of acoustical capacitances and inductances arranged in a filter network. Such silencers ave often been subjected to serious mechanical vibration due to the pulsing acoustic energy released by the engine. As another and perhaps more complex example of such systems, piston-type gas compressors are often connected into a common header and this header acts as the acoustical capacitance wherein the objectionable standing waves are generated. Such header may in some cases comprise one of several acoustic capacitances interconnected by suitable acoustic inductances to form a filter network. In any event, flow through the systems, including the capacitances, is the result of the pumping action of the compressor which generates an acoustic pressure wave having an amplitude, frequency and wave form dependent primarily upon the characteristics of the compressor. In many instances, the pressure wave is of complex form. For example, a multi-cylinder compressor generates a complex wave composed of a fundamental and its harmonics. Each cylinder generates a frequency equal to the crank rotational speed and all multiples of this speed. These then combine into a complex wave in the manifold which is formed by the combinations of cylinders. Various of these harmonics as well as the fundamental may have a frequency and amplitude such that standing waves of very considerable magnitude are generated in the capacitances. As a result, the fluid handling system, particularly the capacitances, may be subjected to very serious mechanical vibration.

It is an object of this invention to provide an apparatus and method wherein a plurality of pumping devices generating an acoustic pressure wave of complex harmonic structure can be connected to an acoustical capacitance in such a manner that mechanical vibration is substantially reduced even though the pumping devices may generate several harmonics having frequencies equal to various resonant frequencies of the capacitance.

Another object of the invention is to provide such an apparatus wherein two or more of the pumping devices are connected to a capacitance or vessel in such a manner that standing waves having odd modes of oscillation are suppressed or dampened so that the only standing waves which can exist with any appreciable amplitude in the capacitance are those of even modes of oscillation whereby mechanical vibration of the capacitance is reduced.

Another object of the invention is to provide an acoustical filter wherein an acoustical capacitance is connected to a plurality of flow conduits in such a manner that not only is mechanical vibration of the capacitance due to pulsating acoustic energy prevented from being excessive but also the transmission through the filter of certain resonant frequencies is suppressed.

Another object is to provide a method for preventing excessive mechanical vibration of an acoustical capacitance being fed with acoustic pressure waves from a plurality of sources, the waves having components which would normally cause standing waves to be developed in the capacitance in a manner as to exert unbalanced variable forces thereon.

Other objects, advantages and features of this invention will be apparent to one skilled in the art upon a consideration of the written specification, the appended claims and the attached drawings, wherein:

FIGS. 1, 2, and 3 are respectively elevational, end and plan views illustrating one embodiment of this invention wherein two flow conduits are connected into a single acoustical capacitance;

FIGS. 7, 8 and 9 are again similar to FIGS. 1–6, except they illustrate an arrangement of four flow conduits connected into an acoustical capacitance; and FIG. 10 is a schematic illustration of an acoustic filter embodying the invention.

Like characters of reference will be used for like parts throughout the several views.

Figure 1:
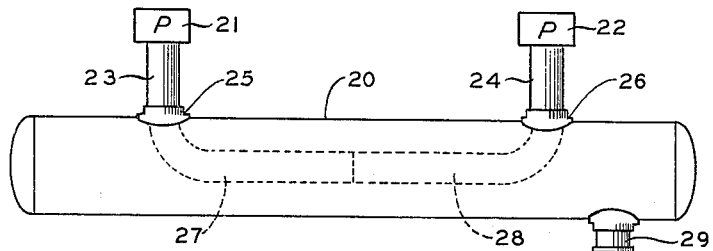

Before referring to the drawings, it should be explained that it has been determined that if pulsing acoustic energy is to cause mechanical vibration in a fluid system, there must be points in the system where acoustic energy is transformed into mechanical energy. The points may for example be at the ends of a bottle. In such case, the bottle will vibrate if the transformation of acoustic energy into mechanical energy at opposite bottle ends is unbalanced; i.e. the vector sum of the mechanical forces, at any given instant, is not equal to zero. Thus when acoustic energy, in the form of pressure pulsations, hits the bottle ends, the bottle will tend to shake unless the energies applied to the respective ends are at all times acting in opposite directions and are of equal magnitudes.

It has also been determined that the unbalanced forces causing vibration of a bottle or acoustical capacitance can result from the establishment of certain types of standing waves in the capacitance at its resonant frequencies. Thus, the resonant frequencies of an acoustical capacitance or bottle are those of an excited pipe essentially closed at both ends. The frequencies at which the bottle is resonant to produce standing waves therein are hence related by the formula:

$$F_N = \frac{NV}{2L}$$

where $F_N$ is a resonant frequency, N is an integer, V is the velocity of sound in the fluid and L is the acoustic length of the bottle. This relationship holds in those instances where (1) the bottle diameter is small compared with the wave length of the sound in the bottle (less than approximately 1/20 of the wave length of the sonic vibration in question) and (2) the bottle length is of the same order of magnitude or longer than the wave length of the sound.

Since the bottle acts as an excited pipe essentially closed at both ends, the standing wave pattern must be such that pressure maxima and minima occur at the ends of the bottle. In this specification, standing waves having odd values of N will be spoken of as odd harmonic standing waves and those having even values of N will be spoken of as even harmonic standing waves. The even harmonic standing waves have pressure maxima occurring simultaneously at opposite ends of the bottle (i.e. in phase) and the pressure minima also occur simultaneously. Accordingly, if the areas at the ends of the capacitance are equal, the mechanical forces generated by the even harmonic standing waves at opposite ends of the capacitance are balanced, i.e. their vector sum is zero. Hence, mechanical vibration cannot occur. However, the odd harmonic standing waves have a pressure maximum occurring at one end of the bottle while at the same time a pressure minimum is occurring at the other end. This causes unbalanced forces to develop with resultant mechanical vibration. It will thus be seen that the only frequencies which can be introduced into a bottle and not contribute to mechanical vibration are those which coincide exactly with the even harmonics of the bottle's fundamental resonance frequency. Even then, these even harmonics will contribute to vibration unless the total energy transferred at one bottle end is equal to and acting opposite from that transferred at the other bottle end, e.g. the effective areas of the opposite ends of the bottle must be equal. All other frequencies introduced into the bottle, especially those frequencies which closely approach or coincide with the odd harmonics of the bottle fundamental resonance frequency, will contribute to mechanical vibration. However, it should be pointed out that at some of these frequencies, the pressure waves will have insufficient amplitude to in themselves cause excessive vibration or even to generate standing waves of sufficient amplitude to do so. In the main, it is those pressure waves of frequencies and amplitudes as to cause large amplitude standing waves having odd modes of oscillation that cause excessive vibration.

In accordance with this invention, the establishment of standing waves having odd values of N or odd modes of oscillation is suppressed by connecting a plurality of flow conduits to the acoustical capacitance or bottle in a manner such that the flow openings of the conduits are situated at approximately the mid point of the length of the bottle. As a result, only those standing waves of even values of N can exist in the bottle at any appreciable amplitude. Hence, the forces derived from the standing waves acting on the ends of the bottle are substantially in phase and balanced. Stated in another manner, the forces exerted on the ends of the bottle by the standing waves are substantially equal at all times but act in directions opposite to each other so that their vectorial sum is zero. Further, since standing waves of odd modes of oscillation are suppressed or entirely eliminated, transmission of pressure waves at such frequencies to a preceding or succeeding flow component will be suppressed.

Figure 2:
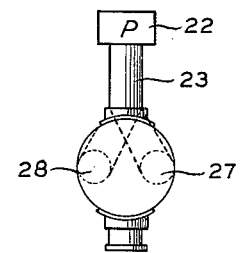
Figure 3:
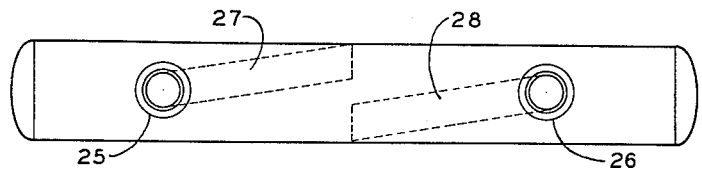

Referring now to FIGS. 1, 2 and 3, there is shown an acoustical capacitance in the form of a bottle 20. The bottle is connected to a plurality of pumping devices 21 and 22 by flow conduits 23 and 24, respectively. These flow conduits have points of physical attachment to the bottle, as at 25 and 26, which are spaced apart from each other and may be symmetrically situated along the bottle length. They are also provided with conduit extensions 27 and 28 inside the bottle, which extend toward each other from the points of physical attachment of the respective flow conduits 23 and 24 with the bottle. These conduit extensions terminate in flow openings which are situated at substantially the mid point of the length of the bottle. Hence, they are at a pressure node of all standing waves having odd values of N. As a result, pressure waves emerging from flow conduits 23 and 24 at frequencies and amplitudes such as to excite standing waves of odd values of N in the bottle actually interfere with such standing waves and suppress the same so that they are either not established at all or only at a magnitude as not to cause excessive mechanical vibration. Hence only standing waves of even values of N will exist in the bottle at any appreciable amplitude.

Another flow conduit 29 is connected to the bottle and preferably its connection is intermediate the ends of the bottle. Such an arrangement permits the ends of the bottle to be of substantially equal area so that the areas acted upon by the standing waves in the bottle are substantially equal and opposite to each other. As a result, the forces exerted by the standing waves are balanced.

The conduit extensions are preferably arranged in the bottle so that their flow openings are offset with respect to each other and with respect to the longitudinal axis of the bottle. By such arrangement, pressure waves emerging from the flow conduit extensions cannot impinge directly against each other.

Figure 4:
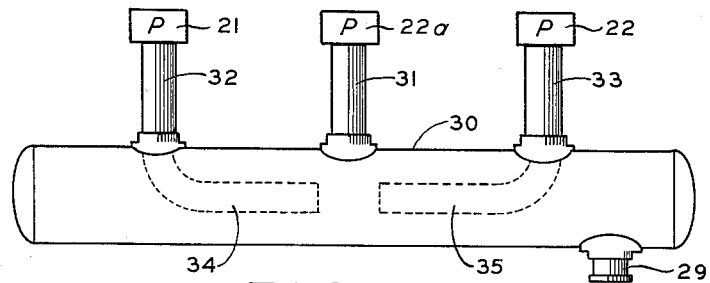
FIGS. 4, 5 and 6 are views similar to FIGS. 1–3, except they show an arrangement for connecting three flow conduits into an acoustical capacitance.
Figure 5:
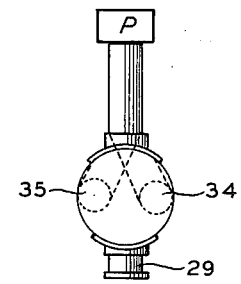
Figure 6:
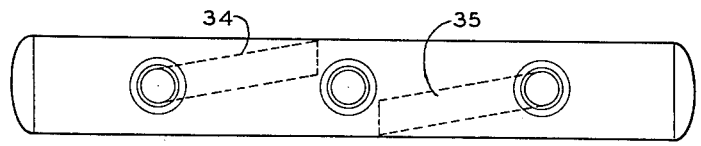

In FIGS. 4 to 6, there is illustrated an arrangement for connecting three flow conduits into a bottle. Thus, bottle 30 has a central flow conduit 31 connected at the mid point of its length and also has two other flow conduits 32 and 33 spaced to either side of the central flow conduit. These other two conduits have extensions 34 and 35 which preferably extend to substantially the mid point of the length of the bottle. However, where the bottle diameter is not substantially greater than the sum of the diameters of the flow conduits, the extensions 34 and 35 can have their end flow openings spaced substantially equidistantly to either side of the mid point of the bottle and a distance apart from each other substantially equal to the diameter of conduit 31. Here again the conduit extensions 34 and 35 are laterally offset from each other. With this arrangement, the pressure waves emerging from each of the flow conduits into the bottle do not impinge directly upon each other.

While the flow openings from conduit extensions 34 and 35 are not situated at exactly the midpoint of the length of the bottle so as to be precisely at a pressure node of the odd N value standing waves, they are close enough to have some effect in suppressing such standing waves. More important, the pressure waves emerging from conduit 31 are at the pressure node and their effect, along with that of waves from extensions 34 and 35 will suppress the odd value standing waves.

Of course, pumping devices 21, 22a and 22 are connected to conduits 31, 32 and 33 as shown.

In FIGS. 7 to 9, there is shown an arrangement for connecting four flow conduits to a bottle in accordance with this invention. Thus, bottle 36 has condutis 37, 38 39 and 40 connected thereto with two of the conduits spaced to one side of the mid point of the length of the bottle and two to the other side. Conduits 37 and 40 have extensions 41 and 42, while conduits 38 and 39 have extensions 43 and 44. In each case, these extensions are shown as formed of arcuate plates 45 having their edges joined to the interior of the bottle and their ends closed as by plates 46. Each of the extensions has an opening 47 at substantially the mid point of the length of the bottle. Baffles 48 can be placed between the extensions to direct pressure waves out the flow openings and prevent their impinging directly upon each other from the various extensions.

It should be pointed out that acoustic pressure waves of the type with which this invention is concerned can be generated by a piston-type compressor, blower, etc. in both its suction and discharge piping. Accordingly, where the invention is to be utilized on the suction side of the pumping device, the flow conduits terminating at the center of the bottle will be connected to the suction side of the respective pumping devices. Flow conduit 29 will then constitute an inlet to the bottle.

On the other hand, when the invention is to be utilized on a discharge side of the pumping device, the flow conduits terminating at the center of the bottles will be connected to the discharge side of the respective pumping devices. Conduit 29 will then be a flow outlet from the bottle. Of course, the invention can be used simultaneously on both the suction and discharge sides of the pumping devices.

It should also be pointed out that the term "pumping device" as used in this specification and claims is intended to mean and include any device which causes a flow of fluid having pulsations manifested as an acoustic pressure wave of complex harmonic structure such as to be capable of causing standing waves of odd modes of oscillation to develop in one or more acoustical capacitances, headers, bottles, etc. with which the device is connected. For example, a pumping device can be one end of a double-acting cylinder connected by a flow conduit to a bottle while the other end is connected by another conduit to the same bottle to thereby constitute another pumping device. It can also include both ends of a double-acting cylinder where such ends are both connected to a bottle by a single flow conduit. It can also be part or all of a multi-cylinder compressor having single or double-acting cylinders so long as the cylinders in question are connected to a bottle by a single flow conduit.

While the invention has been described with reference to a single acoustical capacitance, it is useful in fluid systems having a plurality of such capacitances. Thus, as shown in FIG. 10, a plurality of capacitances 50 and 51 are interconnected by an acoustical inductance or choke 52 (pipe) so as to form an acoustical filter which preferably has a cut-off frequency below the fundamental frequency of the compressors 53 and 54. Choke or acoustical inductance 52 is connected to the mid point of bottle 51 to suppress mechanical vibration thereof. Similarly, flow conduits 55 and 56 are connected between bottle 50 and compressors 53 and 54 as in FIGS. 1–3. The filter can be connected in either or both the suction and discharge piping of the compressor, blower, etc. If desired, the end 57 of choke 52 and flow conduit 58 can be connected to their respective bottles in accordance with copending application Serial No. 514,574, filed June 10, 1955, now Patent No. 2,936,041, so that transmission of pressure waves of unwanted frequencies from the bottle to the choke and conduit are suppressed.

With the arrangement of FIG. 10, it can be seen that there is provided an acoustic filter in which the bottles are not substantially subjected to mechanical vibration. At the same time, the filter can be designed in accordance wtih the principles set out in the copending application so that the transmission of pressure waves of substantial amplitude to flow conduit 58 is suppressed. As a result, not only is the flow conduit 58 protected against mechanical vibration, but also the various elements of the acoustical filter are so protected.

It will be understood that the terms "acoustic filter" or "pulsation dampening filter" mean any combination of junctions, lengths and changes of section along the fluid system which serves to reduce the amplitude of pulsations within the system. Thus, the invention is useful in many different filter arrangements where it is desired to feed a pulsating fluid stream into an acoustical capacitance. It is also useful in systems which technically may not be termed a filter. For example, the invention will find use in preventing vibration of a header to which a number of pumping devices are connected, the header being directly connected to a transmission line rather than any other element of a filter. In this sense then, the term "acoustical capacitance" is meant to include any vessel or chamber which is essentially closed at both ends so that standing waves therein have pressure maxima and minima at such ends. In most instances, the capacitance will have a diameter greater than that of the flow conduits connected to it.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for conducting fluid to or from at least two fluid pumping devices which cause a flow of fluid having pulsation manifested as an acoustic pressure wave of complex harmonic structure without the apparatus being subjected to excessive mechanical vibration resulting from such pulsation comprising an acoustical capacitance in the form of an elongate vessel; a first flow conduit connected to the vessel; at least two other conduits connected to the vessel, the vessel being of substantially greater cross-sectional area than said first and other flow conduits, said other flow conduits being spaced apart at their points of physical attachment to the vessel and each having portions within the vessel extending toward each other from said points of physical attachment, said portions terminating in flow openings which are laterally offset with respect to each other and with respect to the longitudinal axis of the vessel and which are each situated at substantially the mid point of the length of the vessel so that standing waves tending to form in said vessel and having odd modes of oscillation are suppressed and acoustic forces acting on the ends of the vessel are substantially in phase and balanced.

2. The apparatus of claim 1 wherein said first flow conduit is connected to said vessel at a point intermediate the ends of the vessel, said ends being of substantially equal area so that standing waves of even modes of oscillation have substantially equal but opposing areas to act upon.

3. The apparatus of claim 1 in further combination with a fourth flow conduit connected to the vessel, the fourth conduit being attached to and terminating in the vessel at the mid point of the vessel's length.

4. Apparatus for conducting fluid to or from at least two fluid pumping devices which cause a flow of fluid having pulsations manifested or an acoustic pressure wave of complex harmonic structure without the apparatus being subjected to excessive mechanical vibration resulting from such pulsations comprising an acoustical capacitance in the form of an elongate vessel, a first flow conduit connected to the vessel, at least three other conduits connected to the vessel, the vessel being of substantially greater cross-sectional area than said first and other flow conduits, said other flow conduits being spaced apart at their points of physical attachment to the vessel, two of the other flow conduits each having portions within the vessel extending toward each other from said points of physical attachment and the third other flow conduit being attached to and terminating in the vessel at the mid point of the vessel's length, said conduit portions each terminating in flow openings spaced equidistantly from the mid point of the vessel by a distance about equal to one-half the diameter of said third other conduit, said flow openings being laterally offset with respect to each other and with respect to the longitudinal axis of the vessel, whereby acoustic pressure waves emerging from said other conduits do not directly impinge upon each other and whereby standing waves tending to form in said vessel and having odd modes of oscillation are suppressed and acoustic forces acting on the ends of the vessel are substantially in phase and balanced.

References Cited in the file of this patent

UNITED STATES PATENTS

| | | |
|---|---|---|
| 2,124,489 | Hurlock | July 19, 1938 |
| 2,474,555 | Stephens | June 28, 1949 |
| 2,501,794 | Stephens | Mar. 28, 1950 |
| 2,537,203 | Bourne et al. | Jan. 9, 1951 |
| 2,692,025 | Maxim | Oct. 19, 1954 |

FOREIGN PATENTS

| | | |
|---|---|---|
| 22,939 | Great Britain | 1911 |
| 49,204 | France | Sept. 6, 1938 |